Oct. 24, 1961 T. H. THIELE 3,005,487
GAS VALVE CONTROL WITH PLURAL THERMOCOUPLES
Filed Jan. 11, 1957 3 Sheets-Sheet 3
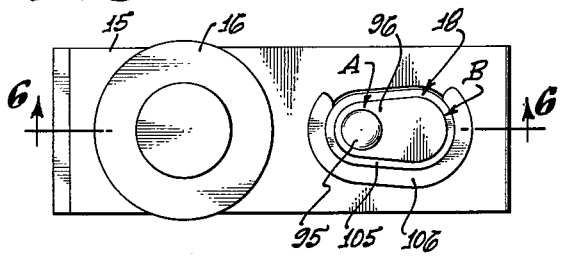
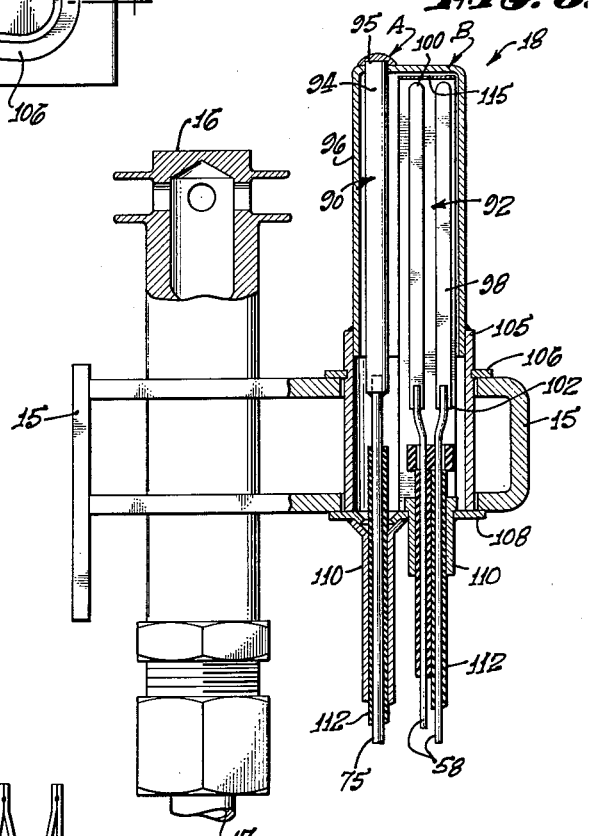
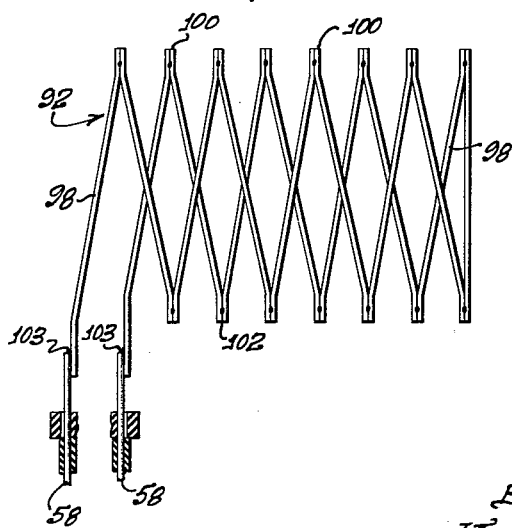
THEODORE H. THIELE,
INVENTOR.
By His Attorneys.
HARRIS, KIECH, FOSTER & HARRIS.

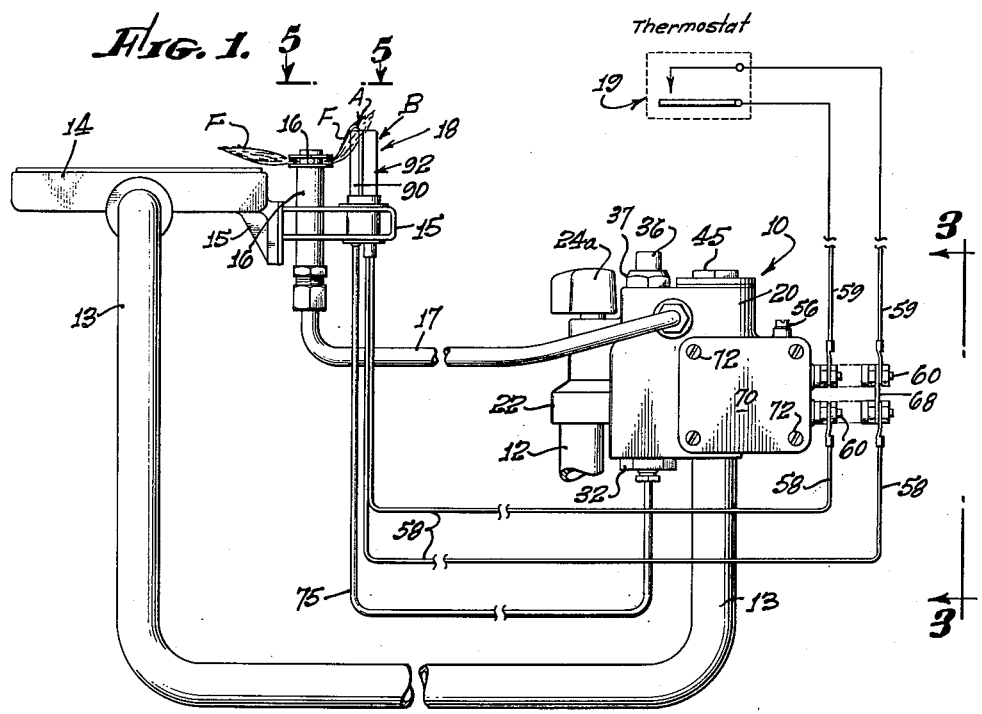

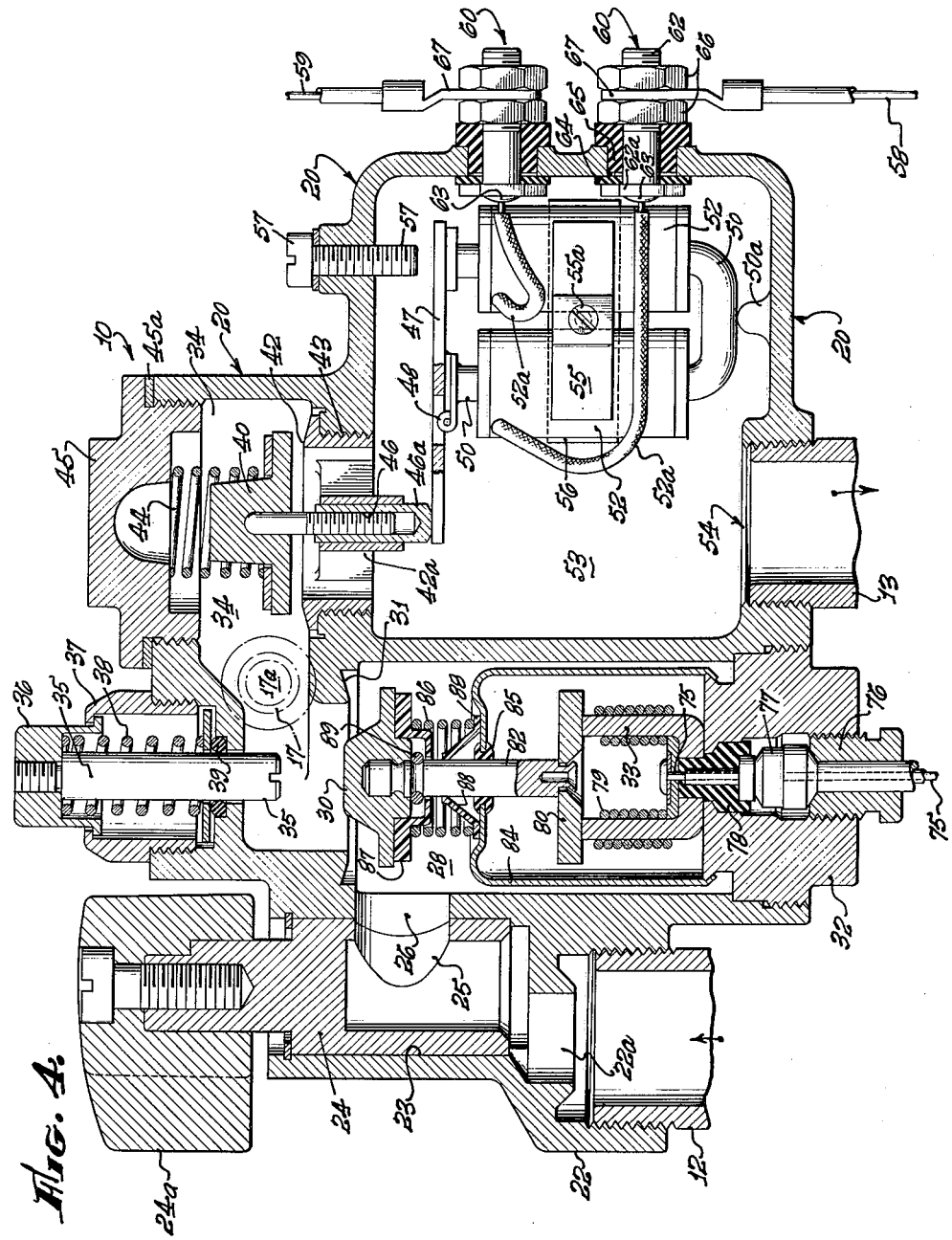

United States Patent Office 3,005,487
Patented Oct. 24, 1961

3,005,487
GAS VALVE CONTROL WITH PLURAL THERMOCOUPLES
Theodore H. Thiele, Rolling Hills, Calif., assignor to American Control Corporation, Compton, Calif., a corporation of California
Filed Jan. 11, 1957, Ser. No. 633,794
5 Claims. (Cl. 158—131)

This invention relates to thermal controls for gas valves of heating systems employing pilot flames, such as used in the regulation of water heaters and in other connections including oven temperature regulation and the like.

It is common in the arts to employ gas-fired heating devices having main burners used in conjunction with pilot burners, wherein the main burners are controlled by ambient temperatures, such as air and water temperatures, through thermostats, the pilot flames serving to re-ignite the main burners following cooling periods. Commonly a thermocouple is employed adjacent the pilot burner for generating sufficient thermoelectric energy to energize an electromagnet which holds open a starting gas valve or so-called safety gas valve after the pilot flame has been manually ignited. Characteristically, a manual valve is required to be operated to provide for passing fuel gas to the main burner after opening the safety valve by the thermocouple; or other manual means is used to initiate supply of fuel to the main burner. In such arrangements thermostats are also used in circuits controlling the main burner gas supply, which thermostats are continuously under the influence of the respective ambient temperatures mentioned.

An object of the present invention is to provide a plural thermocouple control system, so that valves for supplying the pilot flame and for supplying the main burner, in systems of this general nature, are automatically controlled by thermocouples at all times, one thermocouple directly controlling the starting valve and another thermocouple directly controlling the valve to the main burner, which valve will be herein referred to as the "main valve" or "operating valve."

A further object of the invention is to employ separate thermocouples for the mentioned starting valve or safety valve and the main valve or operating valve, in such relationship that there is a time lag in the operation of the main valve following automatic operation of the safety valve by its thermocouple, such time lag being due to differences in construction or differences in location of the two thermocouples, for example.

It is therefore a still further object of the invention, as to one form thereof, to rely upon different electromotive force requirements of magnetic means separately actuating, starting and operating valves, whereby to obtain a time lag between actuation of the two valves; and it is also an object to rely upon different spacings of thermocouples from a source of heat, such as a pilot flame, to effect time lag between energization of two electromagnetic means controlling two valves.

It is additionally an object of the invention to provide a valve structure employing thermocouple controls wherein the respective valve actuating means for the two valves are mounted, preferably separately, in a housing for the two valves through the medium of demountable access means whereby electrical actuating means, including electromagnetic devices for the control of the valves, are readily removable for repair or replacement, without the necessity for removing the valve housing from its location in a gas supply main or pipe system, it being a further object to render the two control valve elements themselves removable readily as required.

In brief explanation of the above I have discovered that a radical departure in control devices of the indicated nature, both in novelty of construction and in efficiency of operation, may be accomplished through the medium of a moderately simple valve housing having an inlet adjacent one end to receive a gas supply pipe and an outlet adjacent its other end to receive a section of gas piping leading to a main burner, there being a reversing gas passage between the inlet and the outlet; there also being a removable plug carrying a starting valve to control gas passage between the inlet and the outlet and also carrying electromagnetic means for maintaining the starting valve open; there being additionally an operating valve, associated with a removable plug, controlling a seat between the starting valve and the outlet; and there being further electromagnetic means in a readily accessible chamber for actuating the operating valve. Associated with this structure are thermocouples for the respective electromagnetic means, such thermocouples being located at a pilot flame, the thermocouple for the starting valve and the electromagnetic means therefor operating under low E.M.F. merely to retain the starting valve open after manual opening by a conventional setting button or "re-set button," and the thermocouple for the operating valve and the electromagnetic means therefor constituting time-lag means generating relatively high electromotive force for positive actuation of the operating valve to open position at a time subsequent to energization of the magnetic device for the starting valve. The valve housing arrangement lends itself, if desired, to the mounting, at the inlet from the service pipe, of a shut-off valve or service valve for the gas supply before such supply reaches the starting or safety valve. With this arrangement the gas supply may be permanently cut off from the electromagnetically actuated valves and their actuating means, so that the latter may be, when necessary, removed for adjustment, repair or replacement, without disturbing the gas plumbing system.

Other objects of the invention and various features of construction thereof will become apparent from the following specification and the accompanying drawings wherein one embodiment of a preferred form is illustrated.

In the drawings:

FIG. 1 is a partially fragmentary and diagrammatic elevational view of a valve housing of this invention in operative relationship with respect to a conventional main burner and pilot burner employing two thermocouples for control of the valves within the housing;

FIG. 2 is a top plan view of the valve housing of FIG. 1;

FIG. 3 is an end elevational view of the valve housing of FIG. 1 as seen from the right of FIG. 1 as indicated by the line 3—3;

FIG. 4 is a vertical longitudinal sectional view through the valve housing of FIGS. 1, 2 and 3 as taken on the line 4—4 of FIG. 2;

FIG. 5 is a top plan view, as taken from the line 5—5 of FIG. 1 of one construction and arrangement for the plural thermocouples and pilot burner;

FIG. 6 is a vertical sectional view as taken from the line 6—6 of FIG. 5; and

FIG. 7 is an expanded structural detail of the high E.M.F. thermocouple seen at the right of FIG. 6.

Referring to FIG. 1, a valve housing 10 constructed in accordance with the present invention is shown as being supported on a gas supply or service pipe 12 and on an outlet pipe 13 leading to a main gas burner 14 of conventional construction. Mounted at the side of the burner 14, as by any appropriate bracket means 15, is a pilot burner 16 supplied with fuel gas by a line 17 leading from the valve housing 10 and arranged to direct tongues of flame F to the burner 14 and to a dual thermocouple combination 18 such as shown in greater detail in FIG. 6, and having a low E.M.F. generating unit A and a high E.M.F. generating unit B which is in circuit with a thermostatic control 19 of apparatus to be controlled such as a hot water heater or an oven. For purposes of this description it may be convenient to treat the system as used with a water heater in which the thermostat 19 is controlled by the temperature in a water tank.

Before considering the arrangement, construction and functioning of the thermocouples, the construction of the valve housing 10 and the construction, arrangement and functioning of the parts therein are described. Here an elongated casing 20, cast and machined for enclosing various chambers and parts, is used. At its left end, the casing 20 is provided with a boss 22 threaded to receive the gas service pipe 12. A bore 22a leads from the top of the boss 22 into an offset elongated vertical bore 23 receiving a hollow plug-type shut-off valve 24 subject to manipulation by an exposed handle 24a on a projecting upper end thereof. The plug valve 24 is provided with a laterally directed port 25 leading from its interior to a port 26 in an adjacent wall of the casing 20, such port 26 then feeding into a vertical cylindrical chamber 28 receiving a biased safety valve or starting valve 30 which is adapted to engage a seat 31 in an overlying intermediate transverse wall as indicated. The valve 30 is carried on a threaded access plug 32 which also carries an electromagnet 33 for affecting the valve 30 as hereinafter to be described. The whole assembly including the safety valve 30, the access plug 32 and the electromagnet 33 is easily introduced into the bore chamber 28 and removed by reason of the threaded mounting of the plug as indicated.

The valve 30 thus controls a passage within the seat 31 up into a transversely disposed chamber 34 whose left end immediately above the valve 30 receives the depending lower end of a manually depressible setting plunger 35 whose upper end is attached to an exposed so-called "re-set" button 36 retained in a plug 37 threaded into the top wall of the casing 20 and normally urged upward into the elevated position illustrated by a coil spring 38. The lower end of the plunger 35 is packed in the casing wall as by means of the illustrated rubber O-ring or the like shown at 39.

At the right end of the gas chamber 34, which constitutes a gas passage, is a main valve or operating valve 40 for controlling gas flow to the main burner 14. The valve 40 is normally biased to closed position on an insert seat 42, threaded at 43 into the corresponding internal casing wall, by means of a coil spring 44 whose lower end surrounds the indicated reduced upper portion of the valve 40 and extends up into an access plug 45 threaded into the top wall of the casing 20 and suitably packed as by means of a gasket 45a.

The valve 40 is adapted to be lifted off its seat 42 through the medium of a pin 46 and an actuating arm 47 pivoted at 48 on and operated by a U-shaped electromagnet 50. The pin 46, which extends upward through a spider 42a in the insert seat 42 into a pocket in the under side of the valve 40, is of telescopic construction, being threaded into a lower sleeve portion 46a, to provide such adjustment as may be required.

The electromagnet 50 and energizing coils 52 therefor are received in an enlarged gas chamber 53, which, when the operating valve 40 is opened, passes fuel gas from the overlying gas passage 34 to an outlet 54 in the bottom wall of the casing 20 and to the gas feed pipe 13 which is threaded into position as shown and leads to the burner 14 as previously mentioned.

The electromagnet 50 and its coils 52 may bear on a rest 50a and be appropriately removably secured in the chamber 53 by any suitable means such as a clamp bar 55 and a clamping screw 55a threaded into an integral boss 56 projecting forward from the back wall of the casing 20. A short stop screw 57 is positioned in the casing 20 above the outer end of the pivoting arm 47 for limiting movement of the arm. Adjacent to the coils 52 the outer end wall of the casing 20 is provided with suitable terminals for supplying thermoelectric energy through leads 52a to the coils 52 from the high E.M.F. thermocouple B of the assembly 18, seen in FIGS. 1 and 6 and presently to be described, by way of conductors 58 from such thermocouple and through the previously mentioned thermostat 19 by way of conductors 59. The mentioned terminals are indicated at 60 and each includes a headed bolt 62 to whose head 62a at the inner wall of the casing (in the case of two of the bolts) the ends of the leads 52a are soldered at 63. Each bolt 62 is appropriately mounted in the casing 20 by an insulating inner washer 64 and a sleeve washer 65. Positioning nuts 66 engage conventional terminal pieces 67 at the ends of the conductors 58 and 59. The other two of the terminal bolts 62, to which are connected the return conductors between the thermostat 19 and the thermocouple B are conveniently connected by a bus bar 68 as seen in FIG. 3.

Access to the chamber 53 for the purpose of adjusting or removing and reinstalling the electromagnet 50 and its coils 52 is readily accomplished through the medium of a removable closure plate 70 at the forward side of the chamber 53, such plate 70 being secured as by means of screws 72 and being sealed as by means of a gasket 73. By these means, the access plate 70 being removed, the two terminal bolts 62 to which the leads 52a are attached may be readily disconnected and withdrawn together with the electromagnet 50 and its coils 52, without in any way disturbing the mounting of the valve housing 10 on the gas pipes 12 and 13, and also without disturbing the pilot gas line 17 leading between the gas passage 34 in the casing 20 to the pilot burner 16. By a simple reversal a new or repaired magnet assembly may be installed and electrically connected.

Similarly, as previously indicated, the plug 32 carrying the safety or starting valve 30 and the electromagnet 33 may be withdrawn, adjusted or repaired, and replaced, without in any way disturbing the pipes 12 and 13 or the pilot gas line 17. For this particular purpose a current conductor 75 from the low E.M.F. thermocouple A of the assembly 18, presently to be described, is set into the plug 32 through the medium of a packing gland 76, a suitable terminal 77 and a tapered insulating member 78 bearing in a seat in the inner end of the access plug 32, the insulator 78 extending through the base of the electromagnet 33. By these means the necessary coil winding 79 for the magnet 33 is supplied in a more or less conventional manner. A bar 80 to be attracted by the electromagnet 33 is fixed on the lower end of a stem 82 of the valve 30. The valve 30 is secured upon the upper end of the stem 82 in any appropriate manner. Thus it may be molded about the upper end of such stem. The valve 30 and its stem 82 are mounted upon the access plug 32 through the medium of an upstanding barrel housing 84 received in the bore of the chamber 28 and having its lower end crimped around the somewhat reduced upper end of the plug 32. The stem 82 may work in a guide washer 85 in a dished transverse top wall of the barrel housing 84. The valve 30 is normally biased upward by means of a coil spring 86 whose upper end bears against a cup-like washer 87 having a reduced central portion around which the upper coils of the spring 86 are received. The lower end of the spring 86 rests upon a flange portion of a washer 88 whose central portion is tapered inward and slidably receives an intermediate portion of the valve stem 82. A snap ring 89 in a groove in the stem 82 between the valve 30 and the cupped washer 87 acts to limit pressure effects of the biasing spring 86 against the valve member 30 when the spring 86 is in its compressed condition under the influence of the electromagnet 33 to retain the valve 30 in open position as illustrated.

With the described mounting of the valve 30 and its electromagnet 33 on the access plug 32, this entire unit is readily removed by unthreading the access plug 32.

Having reference to the thermocouple combination 18, the respective units A and B of this assembly include a low E.M.F. thermocouple generally indicated at 90 and a high E.M.F. thermocouple generally indicated at 92. In the particular form illustrated, the thermocouple 90 includes an inner element 94 having a hot junction 95 with an outer element 96 which may also surround the high E.M.F. thermocouple 92. This is a single couple structure, from which the conductor 75 leads as illustrated, this conductor 75 extending to the electromagnet 33 for the safety or starting valve 30, as above described. The high E.M.F. thermocouple 92, which is shown in expanded relationship in FIG. 7, comprises a plurality of leaves 98 arranged in two series, as shown. This multicouple provides a series of upper hot junctions 100 and a series of lower cold junctions 102. The end leaves in each series of leaves 98 are connected by cold junctions 103 with the previously mentioned conductors 58 leading to the coils 52 for the electromagnet 50 actuating the main or operating valve 40 in the valve casing 20. With this construction of the thermocouple 92 a much higher E.M.F. is developed than with the single couple construction of the thermocouple 90.

It is desired in connection with these thermocouples, not only that the multicouple structure of the thermocouple 92 generate a much higher E.M.F. for opening the valve 40, than that of the thermocouple 90, but also that there be a time lag between the energization of the thermocouple 90 and the energization of the thermocouple 92. For example it may be desired that the thermocouple 90 be energized in only about one minute's time to yield its low E.M.F., whereas energization of the thermocouple 92 may be desired to open the operating valve 40 after three or four minutes. This delay may be accomplished, not only by the multiple construction of the thermocouple 92, but also by placing it in a more remote position with respect to the flame F of FIG. 1 than the thermocouple 90. As shown, the thermocouple 92 is placed on the far side of the thermocouple 90 from the pilot burner 16, as a consequence of which heat from the pilot flame reaches the thermocouple 92 more slowly than it reaches the thermocouple 90.

While the two thermocouples 90 and 92 are shown as encased in a single outer housing 96 which constitutes one element of the single couple construction of the thermocouple 90, these two thermocouples may nevertheless be separated, as roughly indicated at 18 in FIG. 1. However, in either event, they may both be included in a common base structure 105 mounted in the previously described bracket 15 and retained therein as by means of a snap ring 106. The base structure 105, as shown, includes a bottom member 108 carrying appropriate support members 110 with necessary insulations 112. Also, in the form of FIG. 6, a strip 115 of heat insulation such as mica may partially enclose the elements 98 to delay heating and assist the time lag.

Operation

Assuming the described equipment to have been assembled in the relationships indicated, but the various parts being in their non-operating conditions, gas from the service main 12 is admitted to the first gas chamber 28 by rotating the hollow plug valve 24 through the medium of its handle 24a to bring its valve port 25 into alignment with the port 26 of the valve casing 20 leading to the chamber 28. The safety or starting valve 30 being biased by its spring 86 into closed position upon its seat 31, gas from the chamber 28 does not pass to the chamber passage 34, and hence does not reach a port at the position 17a in the side thereof to feed the pilot gas pipe 17. To initiate operation, the starting button or re-set button 36 is depressed against its spring 38 to cause the lower end of its plunger 35 to engage and depress the valve 30 against its spring 86. This supplies gas to the pilot port 17a and the pilot pipe 17 and feeds the pilot burner 16 which is thereupon manually ignited. Depression of the button 36 is maintained until the flame F has sufficiently heated the thermocouple 90 to develop sufficient thermoelectric energy to energize the electromagnet 33 and sufficiently attract the bar 80 at the lower end of the valve stem 82 to hold the safety valve 30 open as illustrated in FIG. 4. Such condition having been attained, the starting button 36 is released and is returned to its elevated position by its spring 38. The electromotive force generated by the thermocouple 90 may ordinarily be only sufficient to hold open the valve 30, but it may be sufficient to open the valve 30 from its closed position if desired, preferably the former.

Manual control is now no longer necessary, even though the operating valve 40 still remains closed. This is because the high E.M.F. thermocouple 92 requires additional time to be heated sufficiently to generate thermoelectric energy adequate to energize the coils 52 of the electromagnet 50 for the operating valve 40. For example, assuming that energization of the electromagnet 33 requires about one minute after lighting the pilot burner 16, the multiple thermocouple 92 will require two or three more minutes of heating to generate the required higher E.M.F. to energize the coils 52. This time lag may be a function of the spacing of the thermocouple 92 from the pilot burner 16 with respect to the thermocouple 90, or a function of the construction of the thermocouple 92, or both.

The system being cold, and requiring heating, such as a quantity of water or an oven requires to be heated, the thermostat 19 will be closed. As a consequence, when the high E.M.F. thermocouple 92 develops thermoelectric energy sufficient to energize the coils 52, the electromagnet 50 will attract the actuating arm 47, and thus rock it about its fulcrum hinge 48 and cause its inner end to elevate the lifting pin 46, 46a and raise the operating valve 40 off its seat 42, for the passage of gas through the chamber 53 and its outlet 54 to the burner feed pipe 13 and thence to the main burner 14. The thermocouple 92 being constantly heated to generate the required electric current, the operating valve 40 will remain open as long as the thermostat 19 remains closed. This condition will continue until the required temperature has been attained in the apparatus to be heated and the thermostat accordingly opens to break the circuit. Opening of the operating valve 40 and firing of the main burner 14 will be repeated when a temperature drop causes the thermostat to be closed and the circuit to the energizing coils 52 to be restored.

However, at all times while the pilot burner 16 produces the flames F, both the low E.M.F. thermocouple and the high E.M.F. thermocouple will be in magnet-energizing condition and operation will be affected only by the thermostat 19. The stop screw 57 may act not merely to limit movement of the magnet-actuated arm 47, but also to allow a little arm movement to get under way before engagement of the lifting pin 46, 46a.

Access to the respective enclosed parts is possible by way of the starting valve plug 32, the operating valve plug 45 and the access plate 70 enclosing the electromagnet 50 and its windings 52.

The invention claimed is:

1. In combination in burner control mechanism: fluid passage means having an inlet and an outlet; an operating valve in said passage means; a safety valve in said passage means between said inlet and said operating valve for admitting fluid to said operating valve; means forming a pilot port leading from said passage means between said valves; both of said valves having means which normally bias said valves to their closed positions; first electromagnetic means connected to said safety valve and energizable to hold said safety valve open against its biasing means; a second electromagnetic means mechanically connected to said operating valve and energizable to open said operating valve against its biasing means; means connected with said pilot port for providing a pilot flame; a first thermocouple adjacent the position of said pilot flame and energizable by said pilot flame to supply an electric current, said first thermocouple being connected in circuit with said first electromagnetic means and being capable of generating electromotive force to energize said first electromagnetic means to retain said safety valve in open position; a second thermocouple adjacent the position of said pilot flame and energizable by the heat of said flame, said second thermocouple being connected in circuit with said second electromagnetic means and being capable of generating electromotive force to energize said second electromagnetic means to open said operating valve; and time-lag-producing means for delaying opening of said operating valve by said second electromagnetic means until after energization of said first electromagnetic means by said first thermocouple.

2. In combination: means providing a fluid passage having an inlet, a main outlet and a pilot outlet between said inlet and said main outlet, and providing a safety-valve seat encompassing said passage between said inlet and said pilot outlet and an operating-valve seat encompassing said passage between said pilot outlet and said main outlet; a safety valve movable between an open position and a closed position wherein it is seated on said safety-valve seat; an operating valve movable between an open position and a closed position wherein it is seated on said operating-valve seat; means biasing said safety valve toward its closed position; means biasing said operating valve toward its closed position; safety-valve electromagnetic means mechanically connected to said safety valve and energizable to hold said safety valve open against its biasing means; operating-valve electromagnetic means mechanically connected to said operating valve and energizable to open said operating valve against its biasing means; a pilot burner connected to said pilot outlet; a safety-valve thermocouple adjacent said pilot burner and connected in series with said safety-valve electromagnetic means; an operating-valve thermocouple adjacent said pilot burner and connected in series with said operating-valve electromagnetic means; and time-lag producing means for delaying energization of said operating-valve electromagnetic means by said operating-valve thermocouple until after energization of said safety-valve electromagnetic means by said safety-valve thermocouple.

3. In combination: means providing a fluid passage having an inlet, a main outlet and a pilot outlet between said inlet and said main outlet, and providing a safety-valve seat encompassing said passage between said inlet and said pilot outlet and an operating-valve seat encompassing said passage between said pilot outlet and said main outlet; a safety valve movable between an open position and a closed position wherein it is seated on said safety-valve seat; an operating valve movable between an open position and a closed position wherein it is seated on said operating-valve seat; means biasing said safety valve toward its closed position; means biasing said operating valve toward its closed position; safety-valve electromagnetic means mechanically connected to said safety valve and energizable to hold said safety valve open against its biasing means; operating-valve electromagnetic means mechanically connected to said operating valve and energizable to open said operating valve against its biasing means; a pilot burner connected to said pilot outlet; a safety-valve thermocouple adjacent said pilot burner in a position to be heated by the flame thereof and connected in series with said safety-valve electromagnetic means; and an operating-valve thermocouple adjacent said pilot burner in a position to be heated by the flame thereof and connected in series with said operating-valve electromagnetic means, said operating-valve thermocouple being characterized by a slower response to a pilot flame emanating from said pilot burner than said safety-valve thermocouple so as to delay opening of said operating valve by said operating-valve electromagnetic means until after said safety-valve electromagnetic means has been energized to retain said safety valve in its open position.

4. In combination: means providing a fluid passage having an inlet, a main outlet and a pilot outlet between said inlet and said main outlet, and providing a safety-valve seat encompassing said passage between said inlet and said pilot outlet and an operating-valve seat encompassing said passage between said pilot outlet and said main outlet; a safety valve movable between an open position and a closed position wherein it is seated on said safety-valve seat; an operating valve movable between an open position and a closed position wherein it is seated on said operating-valve seat; means biasing said safety valve toward its closed position; means biasing said operating valve toward its closed position; safety-valve electromagnetic means mechanically connected to said safety valve and energizable to hold said safety valve open against its biasing means; operating-valve electromagnetic means mechanically connected to said operating valve and energizable to open said operating valve against its biasing means; a pilot burner connected to said pilot outlet; a safety-valve thermocouple adjacent said pilot burner in a position to be heated by the flame thereof and connected in series with said safety-valve electromagnetic means; and an operating-valve thermocouple adjacent said pilot burner in a position to be heated by the flame thereof and connected in series with said operating-valve electromagnetic means, said operating-valve thermocouple being located farther from said pilot burner than said safety-valve thermocouple so that, when a pilot flame is produced by said pilot burner, energization of said operating-valve electromagnetic means is delayed until after energization of said safety-valve electromagnetic means.

5. The combination set forth in claim 4 wherein said safety-valve thermocouple is located between said pilot burner and said operating-valve thermocouple so that said operating-valve thermocouple is shielded from a pilot flame produced by said pilot burner by said safety-valve thermocouple.

References Cited in the file of this patent

UNITED STATES PATENTS

| | | |
|---|---|---|
| 2,253,670 | Wetzel et al. | Aug. 26, 1941 |
| 2,375,569 | McCarty | May 8, 1945 |
| 2,384,696 | Ray | Sept. 11, 1945 |
| 2,518,804 | Marvin | Aug. 15, 1950 |
| 2,623,545 | Traynor | Dec. 30, 1952 |
| 2,635,632 | Mayer et al. | Apr. 21, 1953 |